United States Patent
Yeh

(10) Patent No.: US 8,351,173 B2
(45) Date of Patent: Jan. 8, 2013

(54) POWER SUPPLY CIRCUIT

(75) Inventor: Chia-Ming Yeh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 385 days.

(21) Appl. No.: 12/767,159

(22) Filed: Apr. 26, 2010

(65) Prior Publication Data

US 2011/0228435 A1 Sep. 22, 2011

(30) Foreign Application Priority Data

Mar. 18, 2010 (TW) .............................. 99108068 A

(51) Int. Cl.
*H02H 3/20* (2006.01)
*H02H 9/04* (2006.01)

(52) U.S. Cl. ............ 361/91.1; 361/56; 361/111; 361/86

(58) Field of Classification Search .................. 361/91.1, 361/56, 111, 86
See application file for complete search history.

(56) References Cited

U.S. PATENT DOCUMENTS

| | | | | |
|---|---|---|---|---|
| 5,155,428 A | * | 10/1992 | Kang | 320/136 |
| 5,488,322 A | * | 1/1996 | Kaplinsky | 327/74 |
| 6,188,641 B1 | * | 2/2001 | Uchida | 365/230.06 |
| 6,538,866 B1 | * | 3/2003 | Hanzawa et al. | 361/91.1 |
| 6,987,378 B1 | * | 1/2006 | Steele | 323/222 |
| 2010/0072285 A1 | * | 3/2010 | Nishijima | 235/492 |

FOREIGN PATENT DOCUMENTS

JP 2001-109527 * 4/2001

* cited by examiner

*Primary Examiner* — Rexford Barnie
*Assistant Examiner* — Zeev V Kitov
(74) *Attorney, Agent, or Firm* — Altis Law Group, Inc.

(57) ABSTRACT

A power supply circuit includes an energy-consuming component including an input terminal, an input over-voltage protection circuit connected to the input terminal, and a feed back circuit. The feedback circuit is connected to the input over-voltage protection circuit and the input terminal of the energy-consuming component. The feedback circuit monitors the voltage on the input terminal, compares the voltage on the input terminal with a reference voltage, and turns off the input over-voltage protection circuit to cut off voltage provided to the input terminal of the energy-consuming component when the voltage on the input terminal is larger than the reference voltage.

11 Claims, 4 Drawing Sheets

POWER SUPPLY CIRCUIT

BACKGROUND

1. Technical Field

The present disclosure relates to power supply circuits, and particularly to, a power supply circuit capable of over-voltage protection.

2. Description of Related Art

Electronic devices, such as electronic components in computers, are designed to operate in a certain voltage range. Damage can be caused by, transient voltage spikes that exceed the maximum rated voltage of the electronic devices.

What is needed, therefore, is to provide a power supply circuit with overvoltage protection function which can prevent the electronic devices from being damaged.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
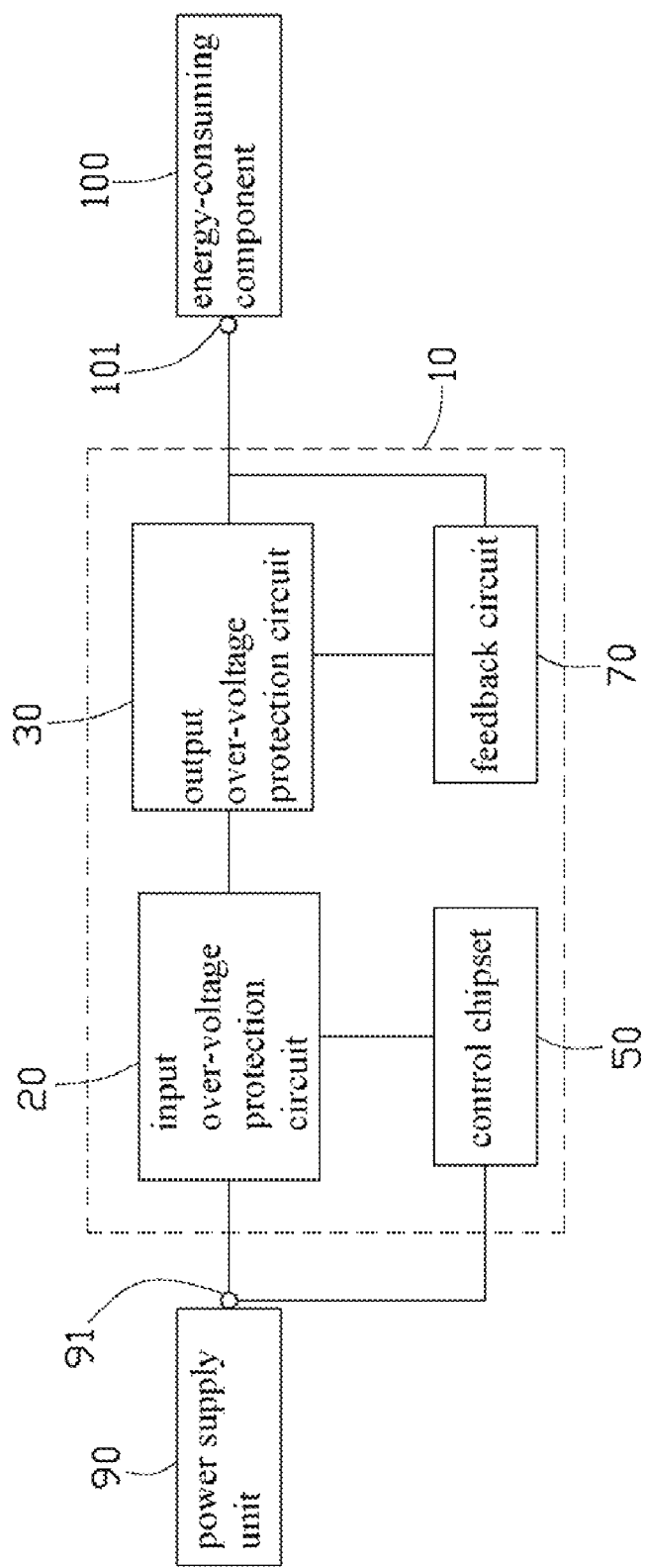
FIG. 1 is a block view of a power supply circuit of an embodiment.

Referring to FIG. 1, a power supply circuit in accordance with an embodiment of the present disclosure includes an over-voltage protection system 10. The over-voltage protection system 10 includes an input over-voltage protection circuit 40, an output over-voltage protection circuit 30, a control chipset 50, and a feedback circuit 70. A power source, such as a power supply unit 90, provides a supply voltage to an energy-consuming component 100 via the over-voltage protection system 10. The over-voltage protection system 10 is capable of protecting the energy-consuming component 100 from damage by over-voltage provided by the power supply unit 90.

The power supply unit 90 includes an output terminal 91. The energy-consuming component 100 includes an input terminal 101. The input over-voltage protection circuit 20 and the output over-voltage protection circuit 30 are connected in series between the output terminal 91 and the input terminal 101. The control chipset 50 connects to the input over-voltage protection circuit 20, and controls the on or off function of the input over-voltage protection circuit 20. The control chipset 50 further connects to the output terminal 91 to monitor a supply voltage outputted by the output terminal 91. The control chipset 50 defines a threshold voltage, which is compared to the supply voltage outputted by the output terminal 91. The feedback circuit 70 connects to the input terminal 101 of the energy-consuming component 100 to receive a feedback signal. The feedback circuit 70 further connects to the output over-voltage protection circuit 30, and controls the on or off function of the output over-voltage protection circuit 30.

Figure 2:
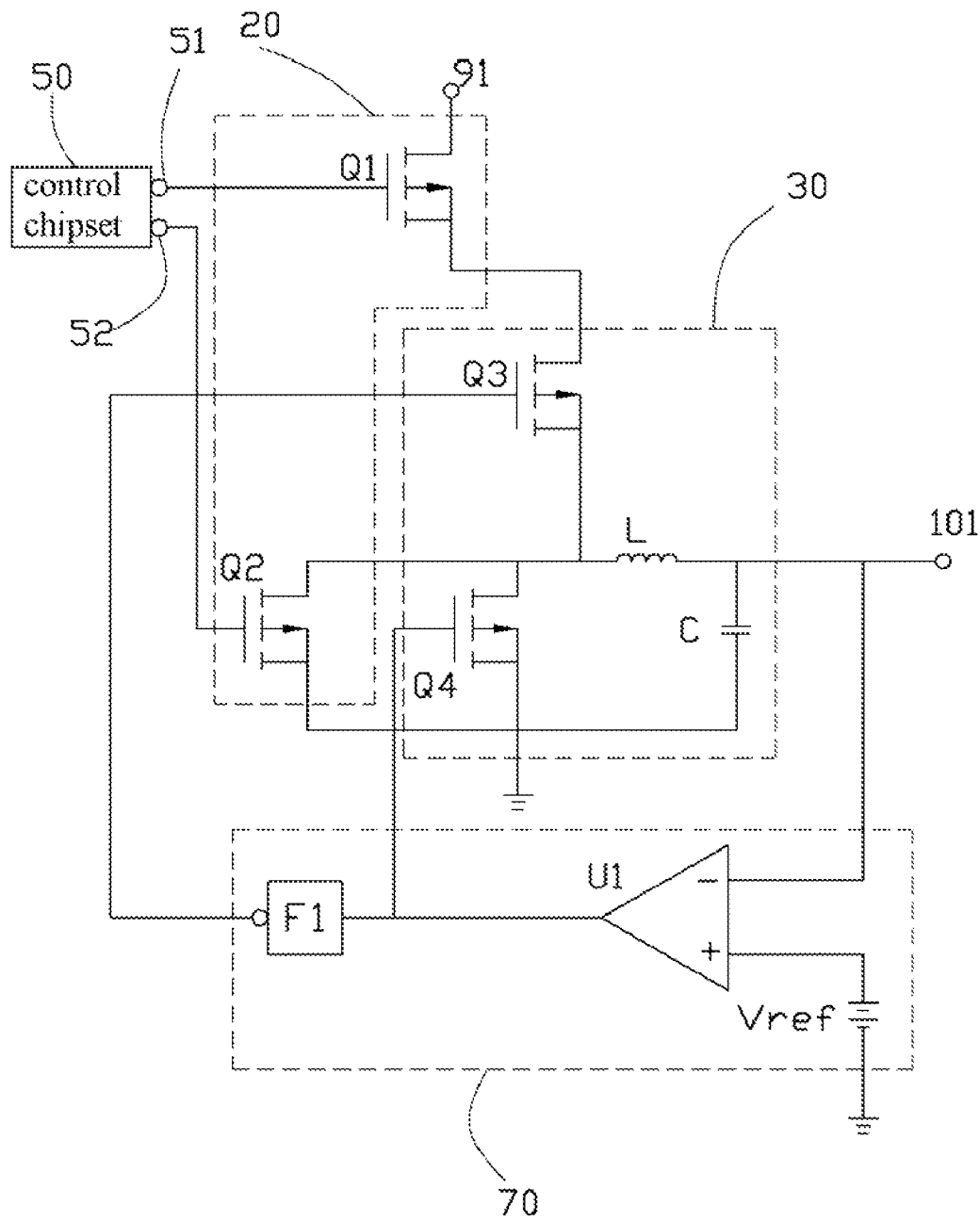
FIG. 2 is a circuit view of the power supply circuit of FIG. 1.

Referring to FIGS. 1 and 2, the input over-voltage protection, circuit 20 includes a first p-channel MOSFET Q1 and a second p-channel MOST Q2. The output over-voltage protection circuit 30 includes a third p-channel MOSFET Q3, a fourth p-channel MOSFET Q4, and LC circuit which includes a capacitor C and an inductor L. The feedback circuit 70 includes a comparator U1 and a reverser F1.

The control chipset 50 includes a first control end 51 and a second control end 52. The first control end 51 is connected to a grid electrode of the first p-channel MOSFET Q1. A drain electrode of the first p-channel MOSFET Q1 is connected to the output terminal 91 of the power supply unit 90. A source electrode of the first p-channel MOSFET Q1 is connected to a drain electrode of the third p-channel MOSFET Q3. A source electrode of the third p-channel MOSFET Q3 is connected to a drain electrode of the second p-channel MOSFET Q2. A source electrode of the second p-channel MOSFET Q2 is connected to ground. A drain electrode of the fourth p-channel MOSFET Q4 is connected to the drain electrode of the second p-channel MOSFET Q2. A source electrode of the fourth p-channel MOSFET Q4 is connected to ground. The drain electrode of the second p-channel MOSFET Q2 is connected to one end of the inductor L. The other end of the inductor L is connected to an end of the capacitor C. The other end of the capacitor C is connected to ground. A joint point of the inductor L and the capacitor C is connected to the input terminal 101 of the energy-consuming component 100.

An inverting input end of the comparator U1 is connected to the input terminal 101 of the energy-consuming component 100. A non-inverting input end of the comparator U1 is connected to a reference voltage Vref. The reference voltage Vref is adjustable to be set at different values. An output end of the comparator U1 connects to a grid electrode of the fourth p-channel MOSFET Q4 and to a grid electrode of the third p-channel MOSFET Q3 via the reverser F1.

During use, the first control end 51 of the control chipset 50 outputs a low level voltage signal to turn on the first p-channel MOSFET Q1, and the second control end 52 outputs a high level voltage signal to turn off the second p-channel MOSFET Q2, when the control chipset 50 monitors that the supply voltage outputted by the output terminal 91 is normal.

Under this situation, if a voltage on the input terminal 101 is smaller than the reference voltage Vref, the output end of the comparator U1 outputs a high level voltage signal to turn on the third p-channel MOSFET Q3 and turns off the fourth p-channel MOSFET Q4. Now, the power supply unit 90 continues providing power to the energy-consuming component 100.

However, if the voltage on the input terminal 101 is larger than the reference voltage Vref, the output end of the comparator U1 outputs a low level voltage signal to turn off the third p-channel MOSFET Q3 and turn on the fourth p-channel MOSFET Q4. Now, the power supply unit 90 cannot provide power to the energy-consuming component 100. Simultaneously, the LC circuit causes the voltage to drop slowly to protect the energy-consuming component 100.

If the control chipset 50 monitors that the supply voltage outputted by the output terminal 91 is higher than the threshold voltage, the first control end 51 of the control chipset 50 outputs a high level voltage signal, and the second control end 52 outputs a low level voltage signal. Thus, the first p-channel MOSFET Q1 is turned off, and the second p-channel MOS- FET Q2 is turned on. The power supply unit 90 cannot provide power to the energy-consuming component 100. Simultaneously, the LC circuit causes the voltage to drop slowly to protect the energy-consuming component 100.

In the above circuit, when one of the voltages of the output terminal 91 and the input terminal 101 is too high, the over-voltage protection system 10 cuts off the connection of the power supply unit 90 and the energy-consuming component 100. Therefore, the energy-consuming component 100 is protected.

Figure 3:
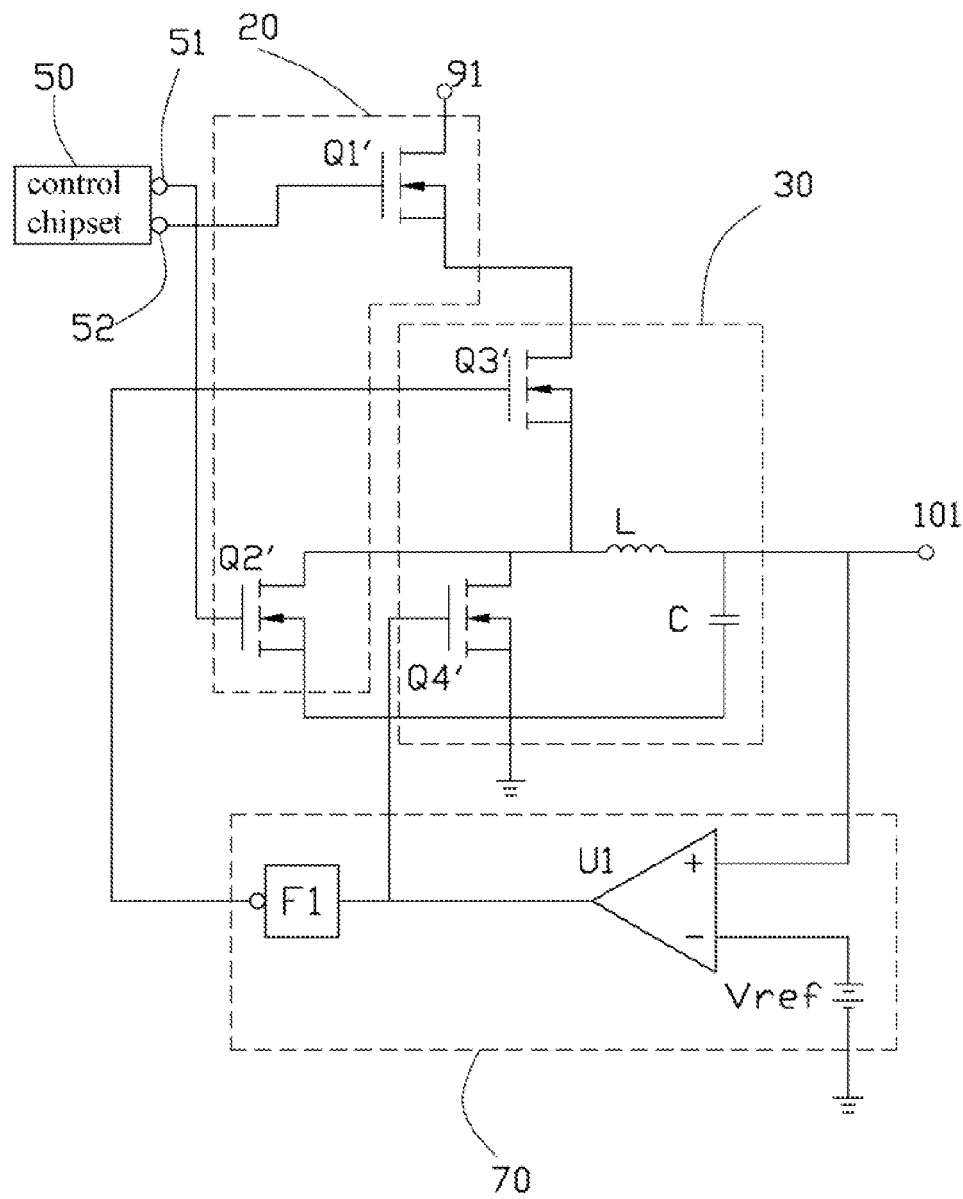
FIG. 3 is a circuit view of a power supply circuit of an embodiment.

Referring to FIG. 3, a circuit of a second embodiment of the power supply circuit is shown. In the second embodiment, the p-channel MOSFET Q1, Q2, Q3, and Q4 of the first embodiment are replaced by n-channel MOSFET Q1', Q2', Q3', and Q4'. The first control end 51 of the control chipset 50 is connected to a grid electrode of the n-channel MOSFET Q2'. The second control end 52 of the control chipset 50 is connected to a grid electrode of the n-channel MOSFET Q1'. The inverting input end of the comparator U1 is connected to the reference Voltage Vref. The non-inverting input end of the comparator U1 is connected to the input terminal 101 of the energy-consuming component 100.

Figure 4:
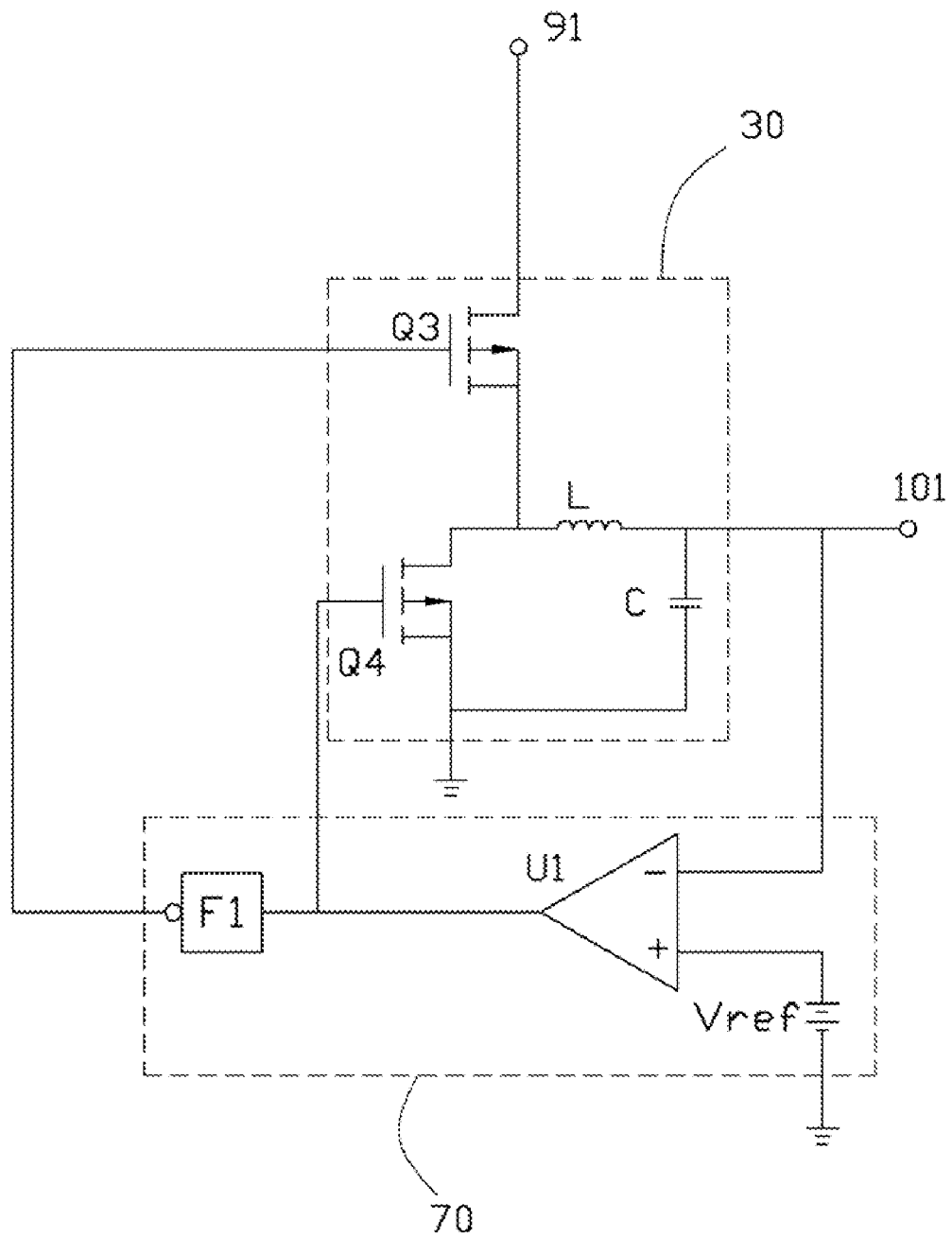
FIG. 4 is a circuit view of a power supply circuit of another embodiment.

Referring to FIG. 4 a circuit of a third embodiment of the power supply circuit is shown. Comparing to the first embodiment, the input over-voltage protection circuit 20 and the control chipset 50 are omitted in the third embodiment. When the voltage on the input terminal 101 is too high, the output over-voltage protection circuit 30 terminates the connection of the power supply unit 90 and the energy-consuming component 100 to protect the energy-consuming component 100.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A power supply circuit, comprising:
an energy-consuming component comprising an input terminal;
an output over-voltage protection circuit connected to the input terminal of the energy-consuming component; and
a feedback circuit connected to the output over-voltage protection circuit and the input terminal of the energy-consuming component, the feedback circuit capable of monitoring the voltage on the input terminal, comparing the voltage on the input terminal with a reference voltage, and turning off the output over-voltage protection circuit to cut off voltage provided to the input terminal of the energy-consuming component when the voltage on the input terminal is larger than the reference voltage;
a control chipset and an input over-voltage protection circuit, wherein the input over-voltage protection circuit connects a supply voltage to the input terminal of the energy-consuming component; the control chipset defines a threshold voltage, the control chipset is capable of monitoring the supply voltage, and turning off the input over-voltage protection circuit to when the supply voltage is larger than the threshold voltage; the input over-voltage protection circuit comprises a first p-channel MOSFET connected in series between the supply voltage and the input terminal of the energy-consuming component; the control chipset comprises a first control end, the first control end is connected to a grid electrode of the first p-channel MOSFET, and capable of outputting a high level voltage signal to turn off the first p-channel MOSFET when the supply voltage is larger than the threshold voltage; and a drain electrode of the first p-channel MOSFET is connected to the supply voltage and a source electrode of the first p-channel MOSFET is connected to the input terminal of the energy-consuming component: the input over-voltage protection circuit further comprises a second p-channel MOSFET, the control chipset comprises a second control end, the second control end is connected to a grid electrode of the second p-channel MOSFET and capable of outputting a low level voltage signal to turn on the second p-channel MOSFET when the supply voltage is larger than the threshold voltage; and a drain electrode of the second p-channel MOSFET is connected to the input terminal of the energy-consuming component, and a source electrode of the second p-channel MOSFET is connected to ground; an inductor is connected between the drain electrode of the second p-channel MOSFET and the capacitor; a capacitor is connected between the inductor and ground, and a joint point of the inductor and the capacitor is connected to the input terminal of the energy-consuming component.

2. The power supply circuit of claim 1, wherein the feedback circuit comprises a comparator, the input terminal of the energy-consuming component is connected to one of an inverting input end and a non-inverting input end of the comparator, the reference voltage is connected to the other one of the inverting input end and the non-inverting input end of the comparator, and an output end of the comparator is connected to the output over-voltage protection circuit.

3. The power supply circuit of claim 2, wherein the output over-voltage protection circuit comprises a third p-channel MOSFET connects a supply voltage to the input terminal of the energy-consuming component; the input terminal of the energy-consuming component is connected to the inverting input end, the reference voltage is connected to the non-inverting input end, and the output end of the comparator is connected to a grid electrode to the third p-channel MOSFET via an inverter.

4. The power supply circuit of claim 3, wherein the output over-voltage protection circuit further comprises a fourth p-channel MOSFET, the output end of the comparator is connected to a grid electrode of the fourth p-channel MOSFET directly, a drain electrode of the fourth p-channel MOSFET is connected to the input terminal of the energy-consuming component, and a source electrode of the fourth p-channel MOSFET is connected to ground.

5. The power supply circuit of claim 4, further comprising a capacitor and an inductor, wherein the inductor is connected between the drain electrode of the fourth p-channel MOSFET and the capacitor; the capacitor is connected between the inductor and ground, and a joint point of the inductor and the capacitor is connected to the input terminal of the energy-consuming component.

6. The power supply circuit of claim 2, wherein the output over-voltage protection circuit comprises a first n-channel MOSFET connected in series between the supply voltage and the input terminal of the energy-consuming component; the input terminal of the energy-consuming component is connected to the non-inverting input end, the reference voltage is connected to the inverting input end; and the output end of the comparator is connected to a grid electrode of the first n-channel MOSFET via an inverter.

7. The power supply circuit of claim 6, wherein the output over-voltage protection circuit further comprises a second n-channel MOSFET, the output end of the comparator is connected to a grid electrode of the second n-channel MOSFET directly, a drain electrode of the second n-channel MOSFET is connected to the input, terminal of the energy-consuming component, and a source electrode of the another n-channel MOSFET is connected to ground.

8. A power supply circuit, comprising:
an energy-consuming component comprising an input terminal;
an input over-voltage protection circuit connecting a supply voltage to the input terminal of the energy-consuming component; and
a control chipset defining a threshold voltage, wherein the control chipset is capable of monitoring the supply voltage, and turning off the input over-voltage protection circuit to cut off the connection between the supply voltage and the input terminal of the energy-consuming component when the supply voltage is larger than the threshold voltage;
a feedback circuit and an output over-voltage protection circuit, wherein the output over-voltage protection circuit is connected in series between the supply voltage and the input terminal of the energy-consuming component; the feedback circuit is ca able of monitoring the voltage on the input terminal, comparing the voltage on the input terminal with a reference voltage, and turning off the output over-voltage protection circuit to cut off the connection between the supply voltage and the in input terminal of the energy-consuming component when the voltage on the input terminal is lamer than the reference voltage; the feedback circuit comprises a comparator, the input terminal of the energy-consuming component is connected to one of an inverting input end and, a non-inverting input end of the comparator, the reference voltage is connected to the other one of the inverting input end and the non-inverting input end of the comparator, and an output end of the comparator is connected to the output over-voltage protection circuit; the output over-voltage protection circuit comprises a third p-channel MOSFET connected in series between the supply voltage and the input terminal of the energy-consuming component; the input terminal of the energy-consuming component is connected to the inverting input end, the reference voltage is connected to the non-inverting input end; the output end of the comparator is connected to a grid electrode of the third p-channel MOSFET via an inverter; the output over-voltage protection circuit further comprises a fourth p-channel MOSFET, the output end of the comparator is connected to a grid electrode of the fourth p-channel MOSFET directly a drain electrode of the fourth p-channel MOSFET is connected to the input terminal of the energy-consuming component, and a source electrode of the fourth p-channel MOSFET is connected to ground; an inductor is connected between the drain electrode of the fourth p-channel MOSFET and the inductor, a capacitor is connected between the inductor and ground, and a joint point of the inductor and the capacitor is connected to the input terminal of the energy-consuming coin one.

9. The power supply circuit of claim 8, wherein the input over-voltage protection circuit comprises a first p-channel MOSFET connected in series between the supply voltage and the input terminal of the energy-consuming component; the control chipset comprises a first control end, the first control end is connected to a grid electrode of the first p-channel MOSFET, and capable of outputting a high level voltage signal to turn off the first p-channel MOSFET when the supply voltage is larger than the threshold voltage; and a drain electrode of the first p-channel MOSFET is connected to the supply voltage, and a source electrode of the first p-channel MOSFET is connected to the input terminal of the energy-consuming component.

10. The power supply circuit of claim 9, wherein the input over-voltage protection circuit further comprises a second p-channel MOSFET, the control chipset comprises a second control end, the second control end is connected to a grid electrode of the second p-channel MOSFET, and capable of outputting a low level voltage signal to turn on the second p-channel MOSFET when the output voltage is larger than the threshold voltage; and a drain electrode of the second p-channel MOSFET is connected to the input terminal of the energy-consuming component, and a source electrode of the second p-channel MOSFET is connected to ground.

11. The power supply circuit of claim 10, further comprising a capacitor and an inductor; wherein the inductor is connected between the drain electrode of the second p-channel MOSFET and the capacitor, the capacitor is connected between the inductor and ground, and a joint point of the inductor and the capacitor is connected to the input terminal of the energy-consuming component.

* * * * *